United States Patent [19]

Carns et al.

[11] Patent Number: 5,523,112
[45] Date of Patent: Jun. 4, 1996

[54] SPRAYING AROMA IN CONTAINERS

[75] Inventors: Lawrence G. Carns, Plain City; Takehito Ohashi, Marysville, both of Ohio

[73] Assignee: Nestec S.A., Vevey, Switzerland

[21] Appl. No.: 327,863

[22] Filed: Oct. 24, 1994

[51] Int. Cl.$^6$ .................................................. B05D 7/22
[52] U.S. Cl. .................. 427/8; 427/236; 427/239; 427/384; 427/424
[58] Field of Search .................. 427/239, 8, 384, 427/236, 424

[56] References Cited

U.S. PATENT DOCUMENTS

| | | | |
|---|---|---|---|
| 3,769,032 | 10/1973 | Lubsen et al. | 99/65 |
| 3,785,254 | 1/1974 | Mann | 427/236 |
| 3,823,241 | 7/1974 | Patel et al. | 426/386 |
| 3,908,049 | 9/1975 | Fitko | 427/236 |
| 4,025,660 | 5/1977 | Crose | 427/236 |
| 4,355,571 | 10/1982 | Stoeckli et al. | 99/485 |
| 4,496,596 | 1/1985 | Stoeckli et al. | 426/388 |
| 4,701,303 | 10/1987 | Nevers | 427/239 |
| 4,871,564 | 10/1989 | Stoeckli et al. | 426/388 |
| 5,030,473 | 7/1991 | Ghodsizadeh | 426/650 |
| 5,222,364 | 6/1993 | Carns et al. | 62/15 |

FOREIGN PATENT DOCUMENTS

0047169A2  3/1982  European Pat. Off. .

Primary Examiner—Janyce Bell
Attorney, Agent, or Firm—Vogt & O'Donnell

[57] ABSTRACT

A process for providing aroma in a container for a product such as instant coffee. Empty, open-topped containers are conveyed one after the other to beneath an aroma spraying station which contains at least one spraying nozzle. Once an open-topped container is positioned substantially beneath a spraying nozzle, the spraying nozzle is activated and aroma is dispensed into the open top of the container while the open-topped container continues to be conveyed. The aroma is dispensed in the form of fine droplets to coat the inner side walls of the open-topped container. The spraying is then discontinued while the open-topped container is still beneath the spraying nozzle. The container may then be transferred to a filling station where product may be filled into the container. In this way, aroma may be incorporated into a product at production rates of 200 to 500 containers per minute.

15 Claims, 2 Drawing Sheets

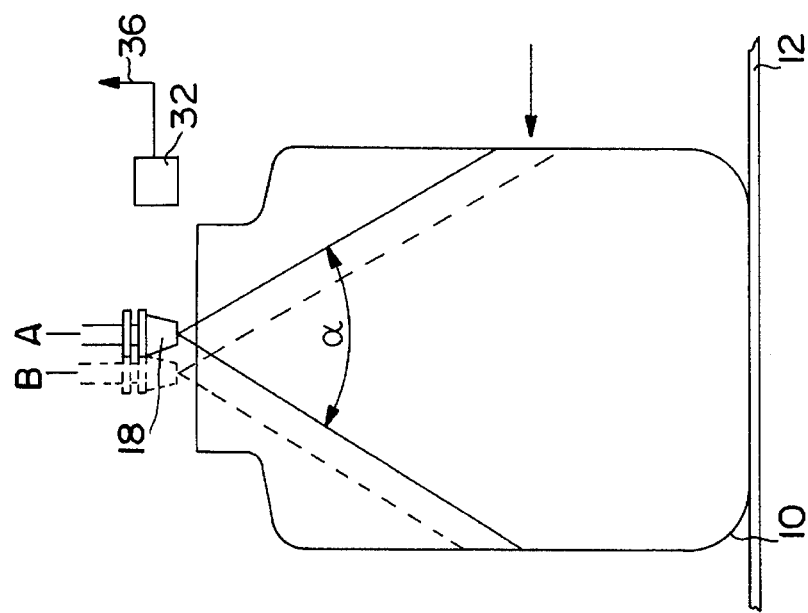
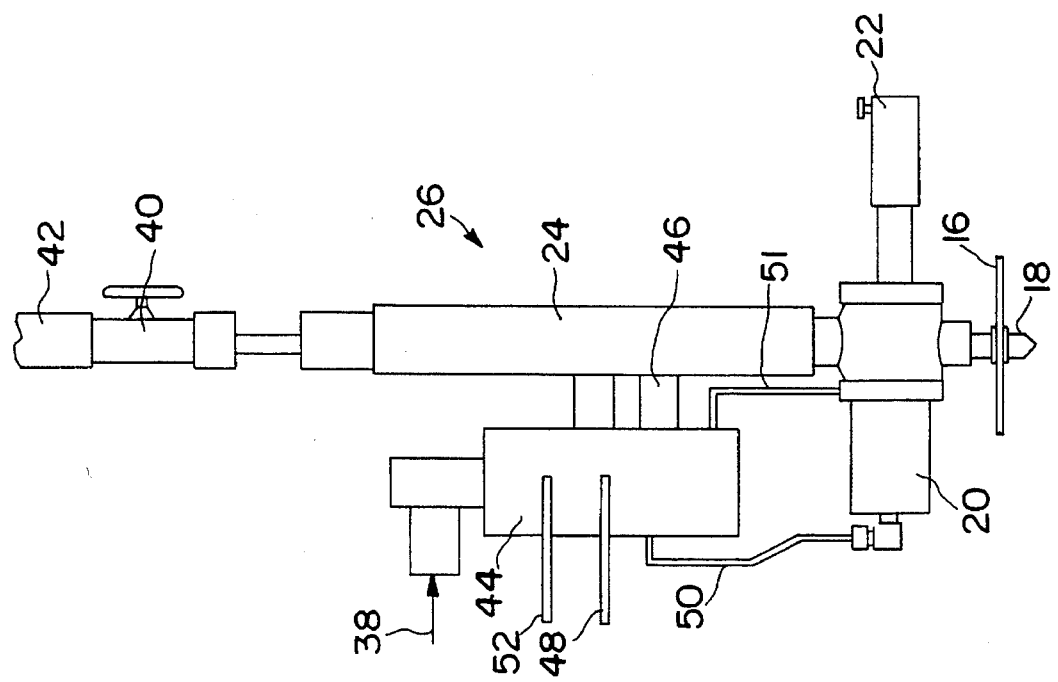

SPRAYING AROMA IN CONTAINERS

FIELD OF THE INVENTION

This invention relates generally to the reincorporation of aroma into products and especially to reincorporation by dispensing of aroma oils into containers prior to or during filling of the containers with the product. The aroma oils, once reincorporated into the product, provide the product with aroma.

BACKGROUND TO THE INVENTION

Consumers associate certain aromas with certain products. If the product lacks the aroma associated with it, consumer perception of the product is adversely affected. This is particularly a problem in the field of instant coffees, although it also exists in other fields. For ease of description, the problem is described in this specification primarily with reference to instant coffees, although the invention is not limited to this application.

Instant coffee powders which are obtained from commercial processes involving extraction, concentration and drying, are usually substantially aromaless. For this reason, it is conventional to trap coffee aromas which are given off during the processing of the instant coffee and to reincorporate these aromas into the instant coffee powder.

Usually the aroma is reincorporated by first capturing the aroma into a substrate such as an oil or emulsion. The aroma-containing substrate is then usually sprayed on the instant coffee powder prior to handling and blending. The blended coffee powders are later filled into jars which are then sealed. Although this process works well, significant amounts of aroma are lost between spraying of the aroma-containing substrate on the coffee powder and filling of the jars.

One attempt to solve the problem is described in U.S. Pat. No. 3,769,032. Here filled coffee jars are transported to beneath a mechanical syringe which contains coffee aroma. The syringe descends into each jar until the needle tip is near the bottom of the jar. The syringe then rises and at the same time injects droplets of coffee aroma into the coffee product in the jar. The droplets should have a size of about 0.5 mm to 3 mm. Although the results reported in the patent indicate good reincorporation of the coffee aroma, the system would not be feasible in a high-speed production line.

Another attempt is disclosed in U.S. Pat. Nos. 4,355,571, 4,496,596 and 4,871,564. Here the coffee aroma is injected into a flowing stream of the coffee powder immediately prior to filling of the coffee powder into jars.

It is also known from European patent application 0047169 to spray coffee aroma onto the inner surface of containers for single serving packets of coffee powder. Thereafter the coated packets are filled with coffee powder and sealed. Although it is mentioned in the patent application that the containers may be "bottles, jars, cans, pouches, bags, envelopes and the like", it is clear that the procedure is intended for small disposable packages made from flexible foils and films. The reason is that it would not be practicable to spray and use bottles, jars and cans of a single serving size.

However, the procedure described in the European application is not readily applicable to more rigid containers, such as jars and bottles, which are of a size which contain multiple servings of the product. Further, since single-serving packets are not transparent and are usually opened by tearing off a corner, it does not matter if the coffee aroma forms unsightly streaks on the insides of the packet. This is not the case for containers which contain multiple servings of the product since they are usually transparent; at least in parts.

SUMMARY OF THE INVENTION

Accordingly, it is an object of this invention to provide a process for reincorporating aroma into a product by dispensing the aroma into containers prior to or during filling of the containers with the products, which is able to operate at commercial speeds with low wastage of aroma and provide a consumer acceptable product.

Accordingly, this invention provides a process for providing aroma in a container for a product, the process comprising:

conveying open-topped containers one after the other to beneath an aroma dispensing station which contains at least one dispensing nozzle;

sensing the position of an open-topped container approaching a dispensing nozzle;

activating the dispensing nozzle when the open top of the open-topped container is substantially beneath the dispensing nozzle and dispensing a liquid aroma formulation into the open top of the container while the open-topped container continues to be conveyed, the dispensing nozzle remaining above the open-topped container during dispensing and the liquid aroma formulation being dispensed in the form of droplets; and discontinuing the dispensing while the open-topped container is still beneath the dispensing nozzle.

The invention provides the significant advantage that the aroma formulation is dispensed into the container whilst the containers are being conveyed. Hence no stopping and starting of the conveying line is required and the process is readily incorporated into conventional filling processes. Also the aroma formulation is dispensed directly into the containers immediately prior to or during filling of the containers. Hence the container is sealed soon after dispensing of the aroma formulation into the container. This reduces aroma losses prior to sealing of the container significantly; for example in tests carried under commercial processing conditions, aroma loss prior to sealing of the container could be reduced by up to 50%. This implies that 50% less aroma formulation need be used to achieve the same "in-jar" aroma strength; a significant saving.

Preferably, the aroma formulation is dispensed into the container by spraying the aroma formulation into the container to coat the inner side walls of the open-topped container with droplets of the aroma formulation. Preferably the aroma formulation is sprayed in a 360° full cone. In this case, it is particularly preferred that the open-topped container be empty or at most partially full prior to spraying of the aroma formulation.

The amount of aroma formulation to be dispensed into the containers will depend upon the strength desired and may vary from application to application and from market to market. The more aroma formulation added, the greater the strength but the greater the cost. Preferably, the dispensing nozzle dispenses an amount of up to about 0.4% by weight (based on the weight of the product) of the aroma formulation into each open-topped container. Further, the amount of aroma formulation is preferably greater than 0.075% by weight. This is particularly the case for the addition of coffee aroma to instant coffee. More preferably, the amount of aroma formulation is between 0.1 to 0.2% by weight; for example about 0.15% by weight.

It is also preferred that the aroma formulation comprises,, aroma formulated into an oil; particularly in the an oil which contains low amounts of moisture; for example less than 10% by weight of moisture and more particularly less than 5% by weight. It is found that reducing the moisture content reduces the tendency of the aroma oil to form streaks and spots on the open-topped containers. However, if the presence of streaking is not a problem (because of the darkness of the product, container labelling which hides the streaking, and the like), aroma oils which contain higher amounts of moisture, and even emulsions, may be used.

The droplet size distribution of the aroma formulation dispensed into the open-topped containers may be selected as desired. However, the larger the droplets forming in the container, the greater the tendency to form visible spots and streaks although, as mentioned above, spots and streaks need not be a problem. Also, as the droplet size decreases, the ratio of surface area to volume becomes larger and aroma loss increases. Hence the droplet size should be optimized for any particular application. Preferably, however the droplet size distribution is selected so that the number of droplets of size above about 3 mm is low. It is especially preferred for the droplets to have a size of less than about 2 mm but greater than about 0.5 mm.

Preferably, the open-topped containers are conveyed beneath the aroma spraying station at a rate greater than 200 containers per minute; for example at a rate of 200 to 500 containers per minute. In these circumstance and under steady state conditions, the mechanical delay between the sensing of the container and initiation of spraying is less than 50 msec, and more preferably less than 40 msec.

Further, preferably the aroma formulation is dispensed into the jar in a time less than 25 msec, and more preferably less than 20 msec.

Preferably the invention also comprises the step of monitoring the speed of the containers and appropriately adjusting the response time between the sensing of an approaching container and activating the dispensing nozzle if there is any change in speed. In this way, accurate dispensing of the aroma formulation into the containers may be ensured despite changes in line speed.

Hence the invention has the additional advantage of providing a process which is able to incorporate aroma into containers over a large range of processing speeds.

In another aspect, this invention provides an open-topped container of which the inside has been sprayed with aroma oil by a process as defined above.

BRIEF DESCRIPTION OF THE DRAWINGS

Embodiments of the invention are now described, by way of example only, with reference to the drawings in which:

FIG. 2 is a schematic illustration of an aroma spraying station; and

FIG. 3 is a side view of a jar being sprayed.

DETAILED DESCRIPTION OF THE INVENTION

Figure 1:
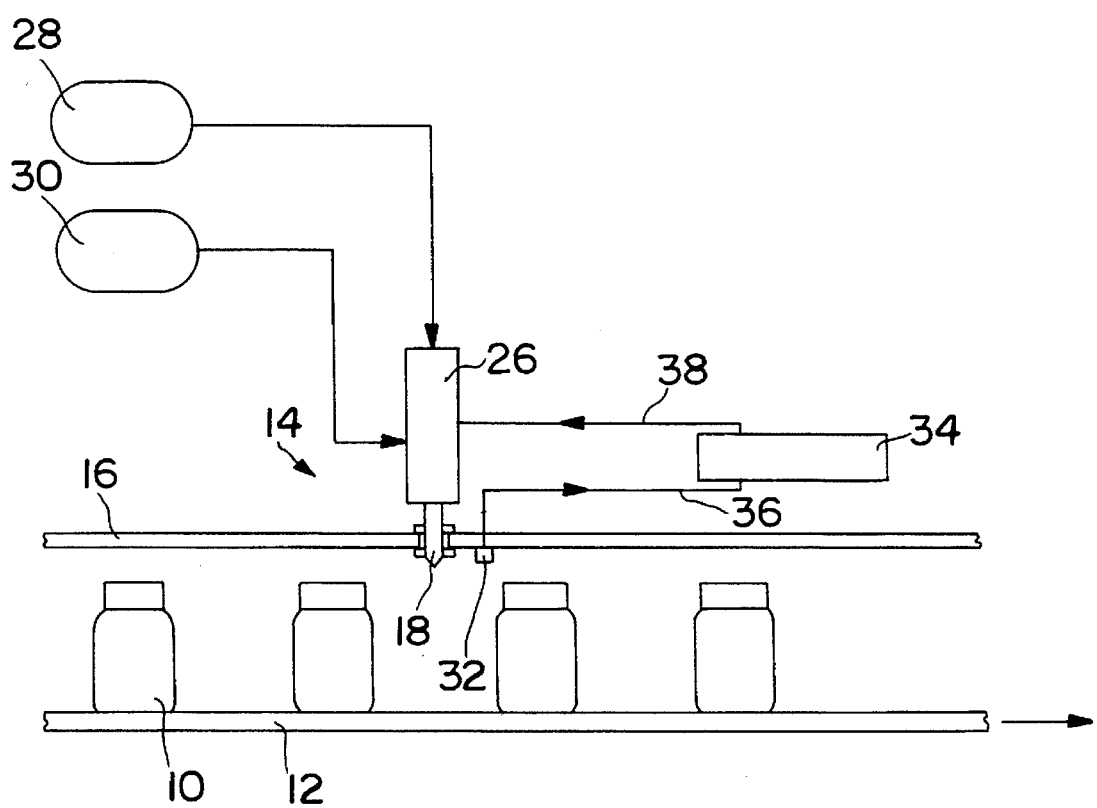
FIG. 1 is a schematic illustration of containers passing beneath an aroma spraying station.

Referring to FIG. 1, empty jars 10 are transported on a conveyor 12 to beneath an aroma spray station 14 and then on to a filling station (not shown) where a product is filled into the jars. The conveyor 12 is covered by a gas shroud 16 which enables an oxygen reduced environment to be maintained during spraying and filling of the jars. Not all filling lines require gas shrouds and hence the gas shroud 16 is not needed.

At the aroma spray station 14, a spray nozzle 18 projects through the gas shroud 16 for the spraying of aroma oil into jars 10 passing beneath the spray nozzle 18. A pump assembly 26 is connected to the spray nozzle 18 for delivering metered doses of aroma oil to the spray nozzle 18 from an aroma oil storage tank 28. The pump assembly 26 is pneumatically driven from an air supply 30. A sensor 32 is positioned under the gas shroud 16 for detecting the position of the jars 10 beneath the spray nozzle 18. The sensor 32 is shown positioned after the spray nozzle 18. Clearly, however, other arrangements of the sensor 32 and the spray nozzle 18 may be utilized. The output signal from the sensor 32 is transmitted to a controller 34 through the controller input line 36. An encoder (not shown) may be connected to the wheel of the filling apparatus (not shown) downstream from the aroma spraying station 14 to signal the speed of the filling wheel and hence the speed of the entire line. The signal from the encoder may be connected to the controller 34. The controller 34, in turn, electronically activates and deactivates the pump assembly 26 through the controller output line 38 at the appropriate time after checking the speed of the line.

As best illustrated in FIG. 2, the pump assembly 26 is formed of an aroma oil manifold 24, which provides a head of aroma oil, and which provides a central support for the pump assembly 26. The aroma oil manifold 24 is connected through a valve 40 to an aroma oil inlet pipe 42. The inlet pipe 42 connects to the aroma oil storage tank 28. A metering pump 20 is mounted beneath the aroma oil manifold 24 and receives aroma oil from the aroma oil manifold 24 at its inlet side. The metering pump 20 is connected through an adjustable volume control device 22 to the spray nozzle 18 for delivering precisely metered doses of aroma oil to the spray nozzle 18. An electrically driven solenoid valve 44 is attached to the aroma oil manifold 24 by mountings 46. The solenoid valve 44 receives pressurized air from the air supply 30 through the air inlet line 48 and supplies pressurized air either to one side of the metering pump 20 through an air drive outlet line 50 or to the other side of the metering pump 20 through an air return outlet line 51. When the solenoid valve 44 is open to drive the metering pump 20, the pressurized air reaching the metering pump 20 through the air drive outlet line 50 drives the metering pump 20. Alternatively, when the solenoid valve 44 is open to return the metering pump 20, the pressurized air reaching the metering pump 20 through the air return outlet line 51 returns the metering pump 20 to its initial position. Exhaust air from the solenoid valve 44 is vented through the exhaust line 52.

It will be appreciated that any suitable aroma spray station 14 which is able to accurately and rapidly spray a metered dose of aroma oil at specific times may be used. However the MICRO-METER "AIRLESS " LIQUID APPLICATOR supplied by Spray Dynamics, a division of the Par-Way Group, 750 W. 17th Street, Costa Mesa, Calif., USA is particularly suitable. This spray station 14 has a spray nozzle 18 in the form of a poppet nozzle with a self adjusting orifice and which is able to spray a 360° full cone at an angle of about 60°, amongst other angles. This spray station 14 also uses a model 40 volumetric metering pump which has a piston to deliver a pulse of liquid from a pump chamber. The piston is driven by air, for example at 80 to 100 psig at 1.2 scfm (550 to 690 kPa at 28 standard 1/min) and is able to deliver doses of about 0.07 to 0.7 grams in less than about 50 msec. If higher air pressures are used to drive the pump, it is possible to obtain finer droplet sprays from the spray nozzle 18. Conversely if lower pressures are used. In this way, the droplet size may be influenced as desired. The adjustable volume control device 22 comprises an adjustable piston stop in the pump chamber by means of which the stroke of the piston, and hence the volume of liquid delivered, may be adjusted.

Clearly however, it is not necessary to have an adjustable volume control device 22. If the aroma spray station 14 is fixed in a processing line and must constantly deliver a certain dose of aroma oil, an adjustable control is redundant. Similarly, any suitable metering pump which can provide an accurate dose in a very short time, may be used. It is not necessary to use the metering pump 20 described above or even a piston pump; other types of commercially available metering pumps may be used. Similarly, any suitable spray nozzle may be used; particularly spray nozzles which are able to deliver 360° cones of droplets of size less than 3 mm. Large numbers of different types of suitable spray nozzles are commercially available; for example those described in U.S. Pat. Nos. 3,635,125 and 3,827,339, the disclosures of which are incorporated by reference.

The solenoid valve 44 may be any suitable solenoid valve which is able to open and shut at high speed. Suitable valves may be obtained from Numatics, Milford Road, Highland, Mich. 48357, USA.

The sensor 32 may be any suitable sensor which is able to accurately and readily detect the position of the jars 10 and transmit an appropriate signal to the controller 34. Suitable optical sensors or inductive proximity controls such as may be obtained from Allen-Bradley, 1201 South Second Street, Milwaukee, Wis. 53204, USA and Banner Engineering Corp. P.O. Box 9414 Minneapolis., Minnesota 55440, USA.

Suitable controllers 34 are readily available such as the SLC 500 series of controllers available from Allen-Bradley, 1201 South Second Street, Milwaukee, Wis. 53204, USA. Suitable encoders may also be obtained from Allen-Bradley.

In use, aroma oil is delivered from the aroma oil storage tank 28 through the aroma oil inlet line 42 to the aroma oil manifold 24. If desired, a level detector is fitted in the aroma oil storage tank 28 and is connected to the controller 34 to warn of reduced levels of aroma oil. Filtered plant air is supplied to the solenoid valve 44. Jars 10 are transported on the conveyor 12 at productions speeds, for example up to 500 jars per minute, beneath the spray nozzle 18. This corresponds to a linear speed of the jars of more than about 1 mm/msec. Once the sensor 32 detects the presence of the leading edge of any jar 10, this is signalled to the controller 34. The controller 34, through the signal obtained from the encoder, monitors the speed of the jars 10 and calculates a suitable delay prior to activating the solenoid valve 44 which forces the piston into its stroke. Once the piston begins to move, aroma oil begins to spray from the spray nozzle 18. In this way, when the spray nozzle 18 opens, the centre of the jar 10 is positioned substantially beneath the spray nozzle 18. This is best illustrated in FIG. 3 as position A. It will be appreciated however that the spray nozzle 18 may begin to spray before the centre of the jar 10 passes under it.

The spray nozzle 18 then sprays a 360° full cone of aroma oil into the opening of the jar 10. Preferably, the angle $\alpha$ of spray is about 60°. The advantage of a 360° full cone is that even coverage of the aroma oil on the inner walls of the jar 10 is obtained. The spray nozzle 18 continues to spray until the piston reaches the end of its stroke. The piston reaches the end of its stroke while the opening of the jar 10 is still positioned beneath the spray nozzle 18. This is illustrated in FIG. 3 as position B. In this way, spray of aroma oil on the outside of the jar 10 is avoided. A short delay after the piston reaches the end of its stroke, the controller 34 deactivates the solenoid valve 44 to permit the piston to return to its initial position. In the meantime, the metering pump 20 recharges for the next jar 10. The jar 10 which has been sprayed is then conveyed to a filling station where the product to be filled in the jar 10, is filled in the jar 10. The fine droplets of the aroma oil are then absorbed into the mass of the product and, in this way, are reincorporated into the product. If the droplets are sufficiently fine, no, or negligible, spotting or streaking of the aroma oil on the inner walls of the jar occurs.

If it is desired to avoid visible spots and streaks of aroma oil in the jars 10, the oil droplets which are sprayed from the spray nozzle should have a droplet size distribution such that only a small fraction of the droplets have a size greater than about 3 mm. It is found that droplets with a size greater than about 3 mm tend to stick to the glass and do not soak into the product. This may increase the chances of the oil forming visible spots on the jar 10. The droplet size distribution may be readily controlled by appropriately selecting the air pressure which operates the metering pump 20, the size of the spray nozzle 18, the tension of the spring of the spray nozzle 19, the viscosity of the aroma oil, and the like. Manufacturer's instructions and specifications may be consulted.

The aroma oil may be any suitable aroma oil. For products such as instant coffees or teas, the aroma oil is suitably produced by combining aroma which has been collected during the processing of the coffee or tea with an edible oil substrate. Procedures for collecting the aromas are well known. Usually they entail flushing the volatile aromas from the tea or coffee during processing using an inert carrier gas such as nitrogen. The aroma-laden carrier gas is then chilled to temperatures lower than −40° C., and often as low as −195° C., to cause the aromas to condense. The condensed aromas are then collected. The condensed aromas are then usually absorbed into a suitable carrier such as coffee or tea oil, concentrated coffee or tea extracts, liquid glycerides which have neutral flavours, and suitable emulsions (for example coffee oil-coffee extract emulsions). Alternatively, the aromas may be absorbed into the carrier during condensation. Suitable procedures for carrying out the condensation and absorption steps are disclosed in, for example, U.S. Pat. Nos. 3,823,241, 5,030,473, and 5222364 (the disclosures of which are incorporated by reference). Clearly, equivalent procedures may be used for products other than coffee and tea.

It has been found that less spotting and streaking occurs if the aroma is formulated into an oil base with low levels of moisture; for example less than 10% moisture and more particularly less than 5% moisture. If the aroma is found to contain too much moisture, spotting of the aroma oil on the jar is found to occur. For this reason, oils obtained from the product to be packaged (such as coffee oil) or liquid glycerides obtained from edible fats and oils such as cottonseed oil, soybean oil, coconut, oil, rapeseed oil, corn oil, sunflower seed oil, peanut oil, and the like are preferred. Especially preferred are oils which easily separate from aqueous solutions so that removal of moisture from the oil is facilitated. For products such as coffee, coffee oils are particularly preferred since the product remains a 100% coffee product. Coffee oils may be extracted from spent coffee grounds and the like using procedures which are well known in the art. Alternatively, the coffee oils may be purchased from commercial sources.

The amount of aroma oil sprayed into the jar 10 is selected to provide sufficient aroma strength but is preferably not sufficient to result in spotting or streaking in the jar 10. This amount will vary from jar to jar since larger jars will require more aroma and from product to product and market to market but is readily determined. For example, for a 200 g (7 ounce) jar, a dose of about 0.3 g of coffee aroma oil gives excellent aroma strength and little or no spotting or streaking.

Since the jars 10 are moving at commercial processing speeds, anywhere from 200 to 500 jars per minute may be passing beneath the spray nozzle 18. This translates into a linear jar speed of from 0.5 to 1.5 mm/msec. On the assumption that most jars have an opening of from 60 to 80 mm, the opening of the jar 10 may be under the spray nozzle 18 for a time in the region of about 40 msec to about 160 msec. Hence activation of the metering pump 20, spraying of the dose, and deactivation of the metering pump 20 must take place in a matter of milli seconds. However, using the sensor 32, the solenoid valve 44 and the metering pump 20 described earlier, the delay between the sensor 32 detecting the jar 10 and activation of the metering pump 20 may be reduced to about 36 msec. Similarly, the time taken to spray the dose may be reduced to about 16 msec. This gives more than sufficient time for a jar 10 travelling at about 1 mm/msec and having an opening of about 60 mm and a width of about 100 mm.

It will be appreciated that the jars 10 need not be empty when the aroma oil is sprayed into them; this is merely preferred. It is possible to partially fill the jars with product, spray the aroma oil into them, and then continue filling the jars 10. Alternatively, spraying and filling may take place simultaneously. However, these procedures are much more complicated than spraying the aroma oil into empty jars 10 and the filling the jars with product.

It is also possible to have more than one spray nozzle 18 in the aroma spray station 14 so that multiple lines of jars 10 may be processed simultaneously. It is also possible to have two spray nozzles 18 one after the other and simultaneously spray two jars 10 at once. Alternatively, each line of jars 10 may have its own aroma spray station 14.

Example

Standard instant coffee jars which are sized to contain about 200 g of instant coffee and which have a width of about 108 mm (4.25 inches) between leading and trailing edges are transported on a conveyor at a linear speed of 1.07 mm/msec. This corresponds to a processing speed of 400 jars/minute. The jars have an opening of diameter of about 57 mm (2.25 inches). The jars are separated from one another by about 50 mm (2 inches).

The jars are conveyed under a MICRO-METER aroma spray station supplied by Spray Dynamics. The aroma spray station uses a model 40 volumetric pump and the adjustable volume pulse control is set to deliver 0.3 g of aroma oil per dose. The volumetric pump is driven by air at 550 kPa (80 psig). A nozzle of 3.2 mm (0.125 inch) diameter opening and which sprays a 360° cone at an angle α is used. A model L23BB452B solenoid valve from Numatics is connected to the pump. A model D12SP6FP optical sensor from Banner Engineering Corp. and a model 845TDZ52ECNC encoder from Allen-Bradley is connected to and Allen-Bradley SLC 500 Controller.

Upon detecting the leading edge of the jar, the sensor signals the controller. After monitoring the signal from the encoder, the controller calculates an appropriate delay and, after the delay, activates the solenoid valve. The solenoid valve opens and drives the volumetric pump. The delay between detection of the leading edge of the jar and commencement of spraying is 36 msec. Upon commencement of spraying, the opening of the jar is substantially centrally positioned under the spray nozzle. A dose of 0.3 g of aroma oil is sprayed from the spray nozzle in a 360° full cone and at an angle of 60°. The dose is sprayed within 16 msec.

The controller then deactivates the solenoid valve over a mechanical delay of 20 msec. The return stroke of the volumetric pump takes another 16 msec. The piston chamber of the pump then fills over a period of 62 msec. The aroma spray station is then ready for the next jar which arrives shortly thereafter.

The process is run for about 21 hours to process 500000 jars. Spraying of aroma oil on the outside of the jars is less than 0.1%.

We claim:

1. A process for providing aroma in a container for a product, the process comprising:

conveying open-topped containers one after the other to beneath an aroma dispensing station which contains at least one dispensing nozzle;

sensing the position of an open-topped container approaching a dispensing nozzle;

activating the dispensing nozzle when the open top of the open-topped container is substantially beneath the dispensing nozzle and dispensing a liquid aroma formulation comprising a coffee aroma captured in an oil or an emulsion into the open top of the container while the open-topped container continues to be conveyed, the dispensing nozzle remaining above the open-topped container during dispensing and the liquid aroma formulation being dispensed in the form of droplets; and discontinuing the dispensing while the open-topped container is still beneath the dispensing nozzle.

2. A process according to claim 1 in which the aroma formulation is dispensed into the container by spraying the aroma formulation in a 360° full cone to coat the inner side walls of the open-topped container with fine droplets of the aroma formulation.

3. A process according to claim 2 in which the open-topped container are empty.

4. A process according to claim 1 in which the dispensing nozzle dispenses an amount of between about 0.075% to about 0.3% by weight, based on the weight of the product, of the aroma formulation into each open-topped container.

5. A process according to claim 4 in which the dispensing nozzle dispenses an amount of between about 0.1 to about 0.2% by weight, based on the weight of the product, of the aroma formulation into each open-topped container.

6. A process according to claim 4 in which the aroma formulation comprises aroma formulated into an oil which contains less than about 10% by weight of moisture.

7. A process according to claim 6 in which the oil contains less than about 5% by weight.

8. A process according to claim 1 in which the aroma is dispensed in the form of an oil which contains less than about 10% by weight of moisture.

9. A process according to claim 8 in which the oil contains less than about 5% by weight of moisture.

10. A process according to claim 1 in which the droplets of the dispensed aroma formulation have a size between 0.5 mm and 3 mm.

11. A process according to claim 1 in which the open-topped containers are conveyed beneath the aroma dispensing station at a rate of 200 to 500 containers per minute.

12. A process according to claim 11 in which mechanical delay between the sensing of the container and initiation of dispensing is less than 50 msec, and the aroma formulation is dispensed into the jar in a time less than 25 msec.

13. A process according to claim 1 further comprising the steps of monitoring the speed of the containers and appropriately adjusting the time between the sensing of an approaching container and activating the dispensing nozzle.

14. A process for providing aroma in a container for a product, the process comprising:

conveying empty, open-topped containers one after the other at a rate of 200 to 500 containers per minute to beneath an aroma spraying station which contains at least one spraying nozzle;

sensing the position of an open-topped container approaching a spraying nozzle;

activating the spraying nozzle when the open top of the open-topped container is substantially beneath the spraying nozzle and spraying a liquid aroma formulation comprising a coffee aroma captured in an oil or an emulsion into the open top of the container while the open-topped container continues to be conveyed, the spraying nozzle remaining above the open-topped container during spraying and the liquid aroma formulation being sprayed in the form of droplets of size of about 0.5 to about 2 mm in a 360° full cone for coating the inner side walls of the open-topped container;

discontinuing the spraying while the open-topped container is still beneath the dispensing nozzle; and filling each sprayed container with product.

15. A process according to claim 14 further comprising the steps of monitoring the speed of the containers and appropriately adjusting the time between the sensing of an approaching container and activating the dispensing nozzle.

* * * * *